US 6,713,189 B2
Mar. 30, 2004

(12) United States Patent
Ho et al.

(54) CAST FILMS

(75) Inventors: Kam Wah Ho, Calgary (CA); Norman Dorien Joseph Aubee, Okotoks (CA)

(73) Assignee: Nova Chemicals (International) S.A. (CH)

( * ) Notice: Subject to any disclaimer, the term of this patent is extended or adjusted under 35 U.S.C. 154(b) by 0 days.

(21) Appl. No.: 10/314,679

(22) Filed: Dec. 9, 2002

(65) Prior Publication Data

US 2003/0130464 A1 Jul. 10, 2003

(30) Foreign Application Priority Data

Dec. 24, 2001 (CA) .............................................. 2366519

(51) Int. Cl.⁷ .......................... B23B 27/32; C08F 210/16
(52) U.S. Cl. .................... 428/523; 526/348; 526/348.1; 526/348.2
(58) Field of Search .......................... 428/523; 526/348, 526/348.1, 348.2

(56) References Cited

U.S. PATENT DOCUMENTS

| 5,492,876 | A | 2/1996 | Gillis et al. .................. 502/113 |
| 5,519,098 | A | 5/1996 | Brown et al. ................ 526/116 |
| 5,589,555 | A | 12/1996 | Zboril et al. .................... 526/64 |
| 6,024,483 | A | 2/2000 | Burke et al. ................. 366/295 |
| 6,340,532 | B1 * | 1/2002 | Huang et al. ................ 428/523 |
| 2001/0016632 | A1 * | 8/2001 | Sipos ........................... 526/65 |

* cited by examiner

Primary Examiner—Fred Teskin
(74) Attorney, Agent, or Firm—Kenneth H. Johnson

(57) ABSTRACT

"Cast" films having excellent puncture resistance and tear strength are manufactured from "pseudohomogeneous" linear low-density polyethylene resin. The preferred pseudohomogeneous resins used in the present invention are prepared with an advanced Ziegler Natta catalyst (having a magnesium component and a titanium component), preferably in medium pressure solution polymerization process. The films of this invention are especially suitable for "pallet wrapping" and for wrapping goods of unusual or uneven shapes and sizes.

5 Claims, No Drawings

CAST FILMS

FIELD OF THE INVENTION

This invention relates to cast films made from pseudohomogeneous linear low-density polyethylene.

BACKGROUND OF THE INVENTION

Films of the present invention must be made from linear low-density polyethylene. Linear low-density polyethylene (LLDPE) is conventionally prepared by a polymerization process using a so-called Ziegler Natta catalyst. It is well known to those skilled in the art that the conventional LLDPE resins prepared with Ziegler Natta catalysts do not have a uniform structure or composition. In particular, these conventional resins typically contain a minor amount of a very low density copolymer; a major portion of the "copolymer" having the desired molecular weight and density; and a large "homopolymer" fraction (which does not contain a meaningful amount of the desired comonomer). This lack of polymer homogeneity is associated with several disadvantages; for example 1) "organoleptic" problems caused by the low molecular weight material; and 2) suboptimal impact strengths which are believed to be caused by the crystallinity of the homopolymer fraction. The development of "homogeneous polyethylene" resins has mitigated these disadvantages.

Homogeneous resins may be prepared with the so-called metallocene catalysts which are well known and widely described in the literature.

The resulting "homogeneous" resins have a very uniform composition as evidenced by the substantial absence of very low molecular weight/low density fractions and/or homopolymer fractions.

Cast films prepared from homogeneous resins typically have excellent dart impact strength. However, these films also typically have very poor tear strength in comparison to films made from conventional (Zieglar Natta catalyzed) resins.

SUMMARY OF THE INVENTION

The present invention provides a monolayer cast film having 1) a dart impact strength as determined by ASTM D1709 of greater than 200 grams per mil; and 2) a slow puncture resistance of greater than 100 Joules per millimeter wherein said cast film is prepared from a pseudohomogeneous linear low density polyethylene having a COHO ratio of from 3.5/1 to 19/1 and a stress exponent of less than 1.29.

While not wishing to be bound by any theory, it is believed that the excellent properties of the films of this invention are attributable to two essential characteristics of the LLDPE used to make them, namely a combination of (a) a comparatively narrow molecular weight distribution and (b) the presence of a pseudohomogeneous comonomer distribution (as evidenced by the copolymer/homopolymer or COHO ratio).

It is believed that the "pseudohomogeneous" LLDPE resins of the type described above have not been heretofore commercially available. We have discovered that cast film made from these resins has a very surprising and highly desirable balance of puncture resistance and tear strength properties which are particularly well suited for mono- or multilayer film constructions for packaging goods of unusual size.

Multilayer films are most commonly prepared by coextrusion (as opposed to lamination). Such films are available in constructions of from two to eleven layers. Films having between three and nine layers are typical at the present time. The use of the film of the present invention as the "core layer(s)" (i.e. one or more of the non-surface layers) of a multilayer construction is particularly preferred.

It is also within the scope of the present invention to prepare a multilayer film having at least one layer of film according to the present invention and one or more layers prepared from completely different plastic resins (such as LDPE, PP or EVA).

DETAILED DESCRIPTION

As previously noted, the films of the present invention must be prepared using a pseudohomogeneous linear low-density polyethylene resin. As used herein, the term "pseudohomogeneous" means that the resin has a copolymer/homopolymer (or "COHO") ratio of from 3.5/1 to 19/1 and is preferably from 4.0 to 8.0. Stated alternatively, this means that the pseudohomogeneous resins of the present invention are from about 78% copolymer (corresponding to a COHO ratio of 3.5/1) to 95% copolymer (corresponding to a COHO ratio of 19/1) with the balance being homopolymer. Similarly, the preferred copolymers are from 80% copolymer to about 89% copolymer with the balance being homopolymer. In contrast, conventional LLDPE resins of the same density (made for example, with conventional Ziegler Natta catalysts in conventional polymerization reactors) generally have a COHO ratio of less than 4 (with a COHO ratio of from 2 to 3 being common) and "homogeneous" resins (i.e. resins made with a so-called single site catalyst, such as a metallocene catalyst) are effectively 100% copolymer (i.e. with no appreciable amounts of homopolymer being detectable by conventional analytical techniques).

The LLDPE resins used in the present invention are preferably prepared in using a highly efficient Ziegler Natta catalyst and in a very well mixed solution polymerization reactor.

A. Description of Ziegler Natta Catalyst

The term "Ziegler Natta catalyst" is well known to those skilled in the art. A Ziegler Natta catalyst may be used in this invention. Ziegler Natta catalysts comprise at least one transition metal compound of a transition metal selected from groups 3, 4 or 5 of the Periodic Table (using IUPAC nomenclature) and an organoaluminum cocatalyst which is defined by the formula:

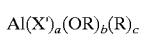

$$Al(X')_a(OR)_b(R)_c$$

wherein: X' is a halide (preferably chlorine); OR is an alkoxy or aryloxy group; R is a hydrocarbyl (preferably an alkyl having from 1 to 10 carbon atoms); and a, b or c are each 0, 1, 2 or 3 with the provisos that a+b+c=3 and b+c≧1.

It is preferred that the transition metal compounds contain at least one of titanium or vanadium. Exemplary titanium compounds include titanium halides (especially titanium chlorides, of which TiCl$_4$ is preferred); titanium alkyls; titanium alkoxides (which may be prepared by reacting a titanium alkyl with an alcohol) and "mixed ligand" compounds (i.e. compounds which contain more than one of the above described halide, alkyl and alkoxide ligands). Exemplary vanadium compounds may also contain halide, alkyl or alkoxide ligands. In addition vanadium oxy trichloride ("VOCl$_3$") is known as a Ziegler Natta catalyst component and is suitable for use in the present invention.

As will be appreciated by those skilled in the art of ethylene polymerization, conventional Ziegler Natta catalysts may also incorporate additional components such as an electron donor (for example an amine or an ether) and/or a magnesium compound (for example a magnesium alkyl such as a butyl ethyl magnesium). A halide source (which is typically a chloride such as tertiary butyl chloride) is typically used when a magnesium compound is present.

Such components, if employed, may be added to the other catalyst components prior to introduction to the reactor or may be directly added to the reactor.

It is highly preferred that the Ziegler Natta catalyst contains a titanium compound, a magnesium alkyl compound and a chloride compound and that an aluminum alkoxide is used as the cocatalyst.

The Ziegler Natta catalyst may also be "tempered" (i.e. heat treated) prior to being introduced to the reactor (again, using techniques which are well known to those skilled in the art and published in the literature). Particularly preferred Ziegler Natta catalysts and methods of preparing them are described in U.S. Pat. Nos. 5,492,876; 5,519,098; and 5,589,555.

B. Description of Solution Polymerization Process

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The solution polymerization process of this invention may use one, two (or more) polymerization reactors. If more than one reactor is used, then the polymer solution exiting from the first reactor is preferably transferred to the second polymerization (i.e. the reactors are most preferably arranged "in series" so that polymerization in the second reactor occurs in the presence of the polymer solution from the first reactor).

A single polymerization reactor is preferably operated at from 190° C. to 250° C. For two reactors, the polymerization temperature in the first reactor is from about 80° C. to about 180° C. (preferably from about 120° C. to 160° C.) and the second reactor is preferably operated at a slightly higher temperature. Cold feed (i.e. chilled solvent and/or monomer) may be added to both reactors or to the first reactor only. The polymerization enthalpy heats the reactor. The polymerization solution which exits the reactor may be more than 100° C. hotter than the reactor feed temperature. The polymerization reactor(s) must be "stirred reactors" (i.e. the reactors are extremely well mixed with a good agitation system). Agitation efficiency may be determined by measuring the reactor temperature at several different points. The largest temperature difference (i.e. between the hottest and coldest temperature measurements) is described as the internal temperature gradient for the polymerization reactor. A very well mixed polymerization reactor has a maximum internal temperature gradient of less than 10° C. A particularly preferred agitator system is described in copending and commonly assigned U.S. Pat. No. 6,024,483. Preferred pressures are from about 500 psi to 8,000 psi. The most preferred reaction process is a "medium pressure process", which means that the pressure in each reactor is preferably less than about 6,000 psi (about 42,000 kiloPascals or kPa), and most preferably from about 1,500 psi to 3,000 psi (about 14,000–22,000 kPa).

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene. Octene-1 is highly preferred.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner. The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing may be desirable to provide a reaction time for the catalyst components prior to entering the reaction. Such an "in line mixing" technique is described the patent literature (most notably U.S. Pat. No. 5,589,555, issued Dec. 31, 1996 to DuPont Canada Inc.).

The residence time in each reactor will depend on the design and the capacity of the reactor. Generally the reactors should be operated under conditions to achieve a thorough mixing of the reactants. In addition, it is preferred (for dual reactor operations) that from 20 to 60 weight % of the final polymer is polymerized in the first reactor, with the balance being polymerized in the second reactor. As previously noted, the polymerization reactors are preferably arranged in series (i.e. with the solution from the first reactor being transferred to the second reactor). In a highly preferred embodiment, the first polymerization reactor has a smaller volume than the second polymerization reactor. On leaving the reactor system the solvent is removed and the resulting polymer is finished in a conventional manner.

Further details of the invention are illustrated in the following, non-limiting, examples.

The first part of the examples illustrates the copolymerization of ethylene and octene-1 to prepare the resins used in this invention.

Data which illustrate the preparation of the inventive films in a "cast" extrusion process are also provided.

Test Procedures Used in the Examples are Briefly Described Below

1. Melt Index: "$I_2$", "$I_6$", "$I_{21}$" and Melt Flow Ratio (which is calculated by dividing $I_{21}$ by $I_2$) were determined according to ASTM D1238. [Note: $I_2$ measurements are made with a 2.16 kg weight and $I_{21}$ measurements are made with a 21.6 kg weight at 190° C.] Test results are reported in units of grams/10 minutes (though these units are often omitted by convention).

2. Stress Exponent ("$S.E._x$") is calculated by $$\frac{\log(I_6/I_2)}{\log(3)}.$$

[Note: Stress Exponent may be regarded as a proxy for molecular weight distribution (i.e. an increase in Stress Exponent value suggests a broadening of molecular weight distribution).]

3. Number average molecular weight (Mn), weight average molecular weight (Mw) and polydispersity (calculated by Mw/Mn) were determined by high temperature Gel Permeation Chromatography "GPC" with differential refractive index "DRI" detection using universal calibration.

4. 1% Secant Modulus (MD/TD) was determined according to ASTM D882.
5. Elongation and Yield measurements were determined according to ASTM D882.
6. Melt strength is determined using the same "melt indexer" apparatus used in the aforementioned ASTM D1238 test method. The apparatus is loaded with resin and preheated for 6 minutes to 190°±0.2° C. as per ASTM D1238. The total piston load used is 18,400 g (consisting of the piston weight of 100 g and a 18,300 g weight). After heating, the polymer is allowed to extrude from the melt indexer die until the piston travels to a predetermined starting point and the strand is removed by cutting. The piston continues to its end point and stops moving. A timing device (e.g. a stopwatch) is activated. The timer is stopped at the instant the extrudate thread falls off the die orifice. The amount of extrudate is then weighed. This procedure is repeated 3 to 5 times yielding different extrudate weights and corresponding times. The results are then plotted on a log—log scale (weight of extrudate in grams versus time in minutes). "Melt strength" is reported as the value (in grams) at the three minute time as is expressed, for example as 0.15 g/3 min.
7. Tensile measurements were made according to ASTM D882.
8. Tear measurements were made according to ASTM D1922.
9. Density was determined using the displacement method according to ASTM D792.
10. Copolymer/homopolymer ("COHO") determinations were made using the Temperature Rising Elution Fractionation (or "TREF") technique which is well known to those skilled in the art and widely described in the literature. As will be understood by those skilled in the art, the "copolymer" and "homopolymer" fractions of the resin have substantially different branching contents and therefore the corresponding crystallization and dissolution temperatures. The results from this analysis are conventionally expressed as a copolymer/homopolymer (or "COHO") ratio. A COHO ratio of 4 indicates that the resin has four parts by weight of copolymer per part by weight homopolymer (or 80% copolymer). Likewise, a COHO ratio of 19 corresponds to 95% copolymer.
11. Branch content distribution was determined by TREF-GPC (Temperature Rising Elution Fractionation—Gel Permeation Chromatography). TREF-GPC combines two techniques well known to those skilled in the art of polyethylene characterization and the procedure is briefly described here. The polymer sample is dissolved in solution and crystallized under dilute condition. Polymer was then separated and collected into different fractions according to solubility which is dependent on comonomer content. The comonomer content (as determined by FTIR), the molecular weight distribution (as determined by GPC) and the amount of polymer in each fraction were then determined. Mathematical summation of the fractions provides a distribution of molecular weight and comonomer content for the entire sample.
12. Puncture strength measurement was determined as follows. An instrumented physical properties testing machine (Instron 4204 Universal Testing Machine) equipped with 1 kilo Newton load cell and a 1½" (38.1 mm) tapered probe head coated with poly(tetrafluoroethylene) (sold under the trademark TEFLON®) are used. A film sample is clamped beneath the probe head with the probe head and the film liberally coated with a water soluble lubricant. The probe head is then pushed through the sample at a speed of 20"/min (500 mm/min) to the rupture point. The final result is calculated based on the energy at failure normalized to 1 mm film thickness for a minimum of five replicate analyses. The test results are shown in Tables 3 and 4 in the row entitled "Slow Puncture with Teflon" and are expressed in Joules per millimeter.
13. Dart impact strength is measured by ASTM D-1709

EXAMPLES

This example illustrates the continuous flow, solution copolymerization of ethylene at a medium pressure using a single pilot scale reactor and a Ziegler Natta catalyst. The reactor was a continuously stirred tank reactor ("CSTR") with a volume of 24 liters. Monomers, solvent and catalyst were fed into the reactor as indicated in Table 1. The solvent used in these experiments was methyl pentane. A Ziegler Natta catalyst consisting of titanium tetrachloride ($TiCl_4$), butyl ethyl magnesium (BEM) and tertiary butyl chloride (TBC), with an aluminum activator consisting of triethyl aluminum (TEAL) and diethyl aluminum ethoxide (DEAO) was used. The BEM and TEAL were provided "premixed" (5/1 Mg/Ti mole ratio).

All catalyst components were mixed in the methyl pentane solvent. The mixing order was BEM/TEAL and TBC; followed by $TiCl_4$; followed by DEAO. The catalyst was pumped into the reactor together with the methyl pentane solvent. The catalyst flow rate had an aim point as shown in the table and was adjusted to maintain total ethylene conversions above 80%.

Table 1 also shows hydrogen flow rates (grams per hour, added as a telomerization agent to reduce polymer molecular weight) and catalyst concentrations.

Table 2 provides the physical properties of the inventive polyethylene resin (shown as resin 1) in comparison to two commercially available polyethylene resins (namely an ethylene hexene resin sold under the trademark NOVAPOL TF-0219E by NOVA Chemicals Corporation "Resin 2"; and an ethylene-octene resin sold under the trademark DOWLEX NG 3347A by the Dow Chemical Corporation "Resin 3")

The resin used to prepare the inventive films has a similar density and a similar melt index (or "MI2") to the comparative resins but a higher COHO ratio.

The three resins shown in Table 2 were then converted into "stretch" films on a conventional cast film line.

The data in Table 3 illustrate that similar operating conditions were used to process the three different resins into monolayer cast films.

Table 4 provides data which describe the physical properties of the three different cast films as shown in table 4, the inventive film has an excellent balance of puncture resistance (as indicated by both the "dart impact" and "slow puncture" results) and tear strength.

TABLE 1

| Polymerization Reactor Conditions | | |
|---|---|---|
| Ethylene flow | (kg/hr) | 89 |
| Octene flow | (kg/hr) | 66.6 |
| Hydrogen flow | (g/hr) | 4.7 |

TABLE 1-continued

Polymerization Reactor Conditions

| | | |
|---|---|---|
| Total flow | (kg/hr) | 650 |
| Inlet temperature | (deg. C.) | 30 |
| Outlet temperature | (deg. C.) | 190.1 |
| Pressure | (MPag) | 14.8 |
| Titanium-a | (ppm) | 7.1 |
| DEAO/titanium | Mole ratio | 1.1 |
| Chlorine/magnesium | Mole ratio | 1.7 |
| TEAL/titanium | Mole ratio | 1.3 |
| Magnesium/TEAL | Mole ratio | 5 |

Notes:
TEAL = Tri (ethyl) aluminum
DEAO = di (ethyl) aluminum ethoxide
a-Titanium concentration in polymerization reactor

TABLE 2

Resin Properties

| Samples | Resin 1 | Resin 2 | Resin 3 |
|---|---|---|---|
| Density (g/cm$^3$) | 0.9173 | 0.9175 | 0.9176 |
| MI2 (g/10 min) | 2.28 | 2.11 | 2.38 |
| MI21 (g/10 min) | 54.7 | 51.96 | 58.9 |
| MI6.48 (g/10 min) | 9.04 | 8.06 | 9.41 |
| Melt Flow Ratio (MI2/MI21) | 24 | 24.6 | 24.8 |
| Stress Exponent | 1.25 | 1.22 | 1.25 |
| Melt Strength (g @ 3 min) | 0.08 | 0.07 | 0.054 |
| Branch Frequency-FTIR | 15.2 | 19.3 | 17.0 |
| Comonomer | Octene | Hexene | Octene |
| Mw | 78900 | 84600 | 79300 |
| Polydispersity (Mw/Mn) | 3.03 | 3.1 | 3.0 |
| COHO Ratio | 7.5 | 2.25 | 2.6 |

TABLE 3

Cast Film Processing Conditions

| Film Processing | Resin 1 | Resin 2 | Resin 3 |
|---|---|---|---|
| Extrusion Line | Cast | Cast | Cast |
| 3.5" Screw Speed (rmp) | 44 | 41 | 43 |
| 3.5" Screw Pressure (psi) | 2340 | 2510 | 2340 |
| 3.5" Screw Current (A) | 79 | 81 | 79 |
| 2.5" Screw Speed (rpm) | 42 | 41 | 41 |
| 2.5" Screw Pressure (psi) | 2670 | 2950 | 2720 |
| 2.5" Current (A) | 52 | 58 | 54 |
| Melt Temp (° F.) | 505 | 506 | 504 |
| Output Rate (lbs/hr) | 431 | 423 | 429 |

TABLE 4

Monolayer Cast Film Properties

| Film Properties | Resin 1 | Resin 2 | Resin 3 |
|---|---|---|---|
| Film Gauge (mil) | 0.80 | 0.85 | 0.80 |
| Dart Impact (g/mil) | 330 | 160 | 190 |
| Slow Puncture-Teflon (J/mm) | 115 | 75 | 75 |
| Peel-Cling Force @ 200% (grams) | 85 | 140 | 95 |
| Tear-MD (g/mil) | 395 | 315 | 405 |
| Tear-TD (g/mil) | 615 | 625 | 665 |
| 1% Sec Modulus-MD (MPa) | 125 | 120 | 130 |
| 1% Sec Modulus-TD (MPa) | 115 | 110 | 115 |
| Tensile Yield Strength MD (MPa) | 7.8 | 8.6 | 8.5 |
| Tensile Yield Strength TD (MPa) | 7.6 | 8.4 | 8.3 |
| Tensile Ultimate Strength MD (Mpa) | 40 | 43 | 37 |
| Tensile Elongation MD (%) | 415 | 365 | 425 |
| Tensile Elongation TD (%) | 670 | 870 | 835 |
| Haze-Total (%) | 1.2 | 2.6 | 1.6 |
| 45 Gloss | 87 | 84 | 82 |

What is claimed is:

1. A monolayer cast film having 1) a dart impact strength as determined by ASTM D1709 of greater than 200 grams per mil; and 2) a slow puncture resistance of greater than 100 Joules per millimeter, wherein said cast film is prepared from a pseudohomogeneous linear low density polyethylene having a COHO ratio of from 3.5/1 to 19/1 and a stress exponent of less than 1.29.

2. A multilayer cast film which incorporates at least one monolayer according to claim 1.

3. The film of claim 1 wherein said linear low-density polyethylene is an ethylene-octene copolymer.

4. The film of claim 3 wherein said ethylene-octene copolymer is further characterized by being prepared in a solution polymerization process using a Ziegler Natta polymerization catalyst system which is characterized by containing a titanium halide, a magnesium alkyl compound, a chlorinating agent and an aluminum alkoxide cocatalyst.

5. The film of claim 1 which is further characterized by having a tear strength as determined by ASTM D1922 of greater than 500 grams per mil in the transverse direction.

* * * * *